(12) United States Patent
Shirota

(10) Patent No.: US 7,061,684 B2
(45) Date of Patent: Jun. 13, 2006

(54) FINDER OPTICAL SYSTEM AND CAMERA PROVIDED WITH THE SAME

(75) Inventor: Eiji Shirota, Hachioji (JP)

(73) Assignee: Olympus Corporation, Tokyo (JP)

( * ) Notice: Subject to any disclaimer, the term of this patent is extended or adjusted under 35 U.S.C. 154(b) by 69 days.

(21) Appl. No.: 10/835,321

(22) Filed: Apr. 30, 2004

(65) Prior Publication Data
US 2004/0223216 A1   Nov. 11, 2004

(30) Foreign Application Priority Data
May 8, 2003   (JP) .............................. 2003-130497

(51) Int. Cl.
*G02B 25/00*   (2006.01)
*G03B 13/02*   (2006.01)

(52) U.S. Cl. ...................... 359/646; 359/643; 359/362; 396/373; 396/384

(58) Field of Classification Search ........ 359/362–432, 359/643–651; 396/373–386
See application file for complete search history.

(56) References Cited

U.S. PATENT DOCUMENTS

| | | | |
|---|---|---|---|
| 5,034,763 A | 7/1991 | Inabata | 396/384 |
| 5,136,427 A * | 8/1992 | Sugawara | 359/646 |
| 5,410,430 A | 4/1995 | Ito et al. | 359/422 |
| 5,434,636 A | 7/1995 | Hasushita et al. | 396/373 |
| 5,889,616 A | 3/1999 | Ohshita | 359/646 |
| 5,946,505 A * | 8/1999 | Lee | 396/152 |
| 6,044,229 A * | 3/2000 | Takato et al. | 396/296 |
| 6,091,910 A * | 7/2000 | Mihara | 396/373 |
| 6,373,645 B1 * | 4/2002 | Kamo | 359/834 |
| 6,692,163 B1 * | 2/2004 | Ogata | 396/354 |
| 6,809,875 B1 * | 10/2004 | Minakata | 359/645 |

* cited by examiner

Primary Examiner—Thong Q Nguyen
(74) Attorney, Agent, or Firm—Kenyon & Kenyon LLP

(57) ABSTRACT

An observation optical system of the present invention comprises an image erect optical system and an eyepiece optical system for observing an object image. The eyepiece optical system comprises a positive single lens having double convex surfaces and a negative meniscus lens having a concave surface directed toward eye point side, and the following condition is satisfied:

$$0<S<0.3$$

$$0.05<d1/f<0.15$$

where $S=(r1-r2)/(r1+r2)$, $r1$ is a curvature radius of the object image side surface of the negative meniscus lens, $r2$ is a curvature radius of the eye point side surface of the negative meniscus lens, $d1$ is a distance of air space between the positive single lens and the negative meniscus lens, which represents a distance of air space when diopter of the observation optical system is adjusted to be $-0.8$ $(m^{-1})$ if the air space is changed, and $f$ is a focal length of the eyepiece optical system.

18 Claims, 10 Drawing Sheets

FINDER OPTICAL SYSTEM AND CAMERA PROVIDED WITH THE SAME

BACKGROUND OF THE INVENTION

1. Field of the Invention

The present invention relates to a finder optical system and a camera provided with the same which are suitable for being built in a camera for photographing, a digital still camera, a video camera and the like.

2. Description of the Related Art

So far in the past, as an eyepiece of observation optical system of a camera and the like, such eyepiece constituted with only one single lens having positive power or a single lens having positive power and a single lens having negative power is well known (refer to for example, Japanese published unexamined patent applications, Toku Kai Hei 10-133127 and Toku Kai Hei 02-304409).

In an eyepiece with constitution of the former case, there is a defect that correction of aberrations including spherical aberration etc., becomes difficult when the height of light becomes large.

On the other hand, an eyepiece having constitution of the latter can secure a good performance since an aberration generated by positive lens can be canceled by negative lens.

SUMMARY OF THE INVENTION

The observation optical system according to the present invention comprises an image erecting optical system for forming erect image of an object image and an eyepiece optical system for observing the object image which has been formed into the erect image, wherein the image erecting optical system comprises at least a prism, an incidence surface at the object image side of the prism has a convex surface, the eyepiece optical system comprises in order from the object image side, positive single lens having double convex surfaces and a negative meniscus lens having a concave surface directed toward eye point side, and the following condition is satisfied:

$0 < S < 0.3$ $0.05 < d1/f < 0.15$ where $S=(r1-r2)/(r1+r2)$, r1 is a curvature radius of the object image side surface of the negative lens, r2 is a curvature radius of the eye point side surface of the negative lens, d1 is a distance of air space between the positive lens and the negative lens, which represents a distance of air space when diopter of the observation optical system is adjusted to be $-0.8$ $(m^{-1})$ if the air space is changed, and f is a focal length of the eyepiece optical system.

In the observation optical system according to the present invention, a surface at the object image side of the single lens is spherical.

In the observation optical system according to the present invention, the negative lens is fixed and adjustment of diopter is carried out by moving the positive single lens.

In the observation optical system according to the present invention, the object image can be observed at the position of 17.4 mm apart from the surface at the utmost eye point side of the eyepiece optical system, and the following condition is satisfied.

$0.86 < r2/IP < 1.72$ where r2 is a curvature radius of the eye point side surface of the negative lens, IP is defined as IP=17.4 mm which is the distance from the surface at the utmost eye point side of the eyepiece optical system to a virtual eye point.

The observation optical system according to the present invention comprises an object optical system for forming the object image at the object image side of the prism.

The observation optical system according to the present invention further comprises a liquid display element for forming the object image at the object image side of the prism.

The observation optical system according to the present invention comprises a screen mat for forming the object image at the object image side of the prism.

The camera according to the present invention comprises one of the observation optical systems mentioned above and a photographing optical system.

These and other features and advantages of the present invention will become apparent from the following detailed description of the preferred embodiments when taken in conjunction with the accompanying drawings.

BRIEF DESCRIPTION OF THE DRAWINGS

FIG. 11 is an outlined perspective front view showing a digital camera in which an observation optical system according to the present invention is built in.

DETAILED DESCRIPTION OF THE PREFERRED EMBODIMENTS

Figure 1:
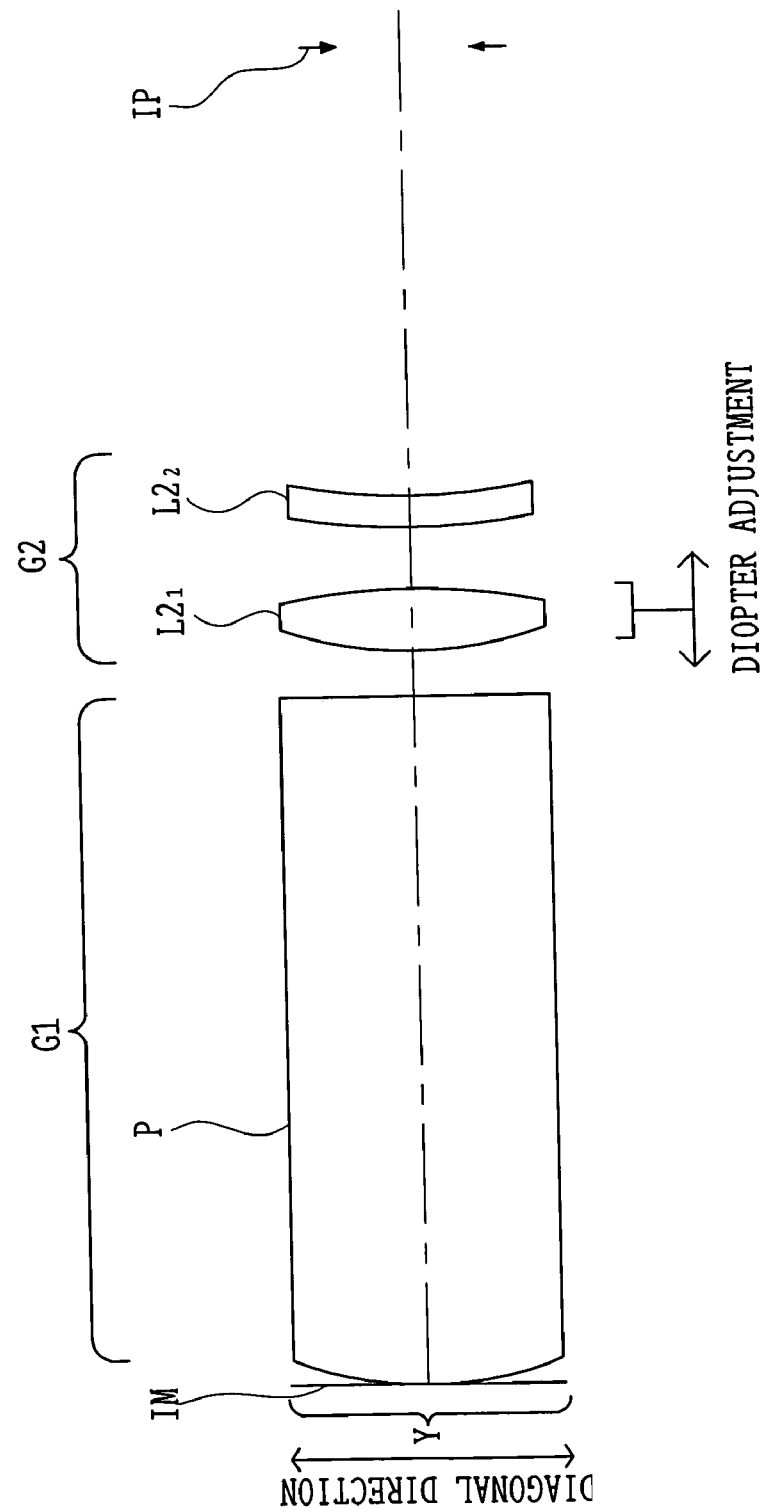
FIG. 1 is a sectional view in a diagonal direction developed along the optical axis of the first embodiment of an observation optical system according to the present invention, wherein a reflecting surface is omitted.

Prior to explanation of embodiments, actions and effects of the present invention will be explained.

By constitution according to the present invention, in which an erect image optical system is constituted with a prism and a convex surface is formed by integrating a field lens with the incident surface at an object image side of this erecting prism, the number of parts can be reduced and a cost reduction can be achieved.

By the effect of this field lens, the angle of incidence of the luminous flux entering into the erecting prism can be made small and, accordingly a luminous flux can be efficiently led to an eyepiece.

According to the present invention, an eyepiece comprises in order from the object image side, positive single lens having double convex surfaces and a negative meniscus lens having a concave surface directed toward eye point side.

By constitution in which the negative lens is formed to be a meniscus shape where the convex surface directed toward the object image side, (that is, concave surface directed toward eye point side), instead of using a negative lens having double concave surfaces or a concave surface directed toward the object image side, the load of the positive power applied to both surfaces of the positive lens (a positive single lens having double convex surfaces) can be shared with three surfaces which are both surfaces of this positive lens and the surface of the negative lens at the object image side.

Accordingly, curvature radius of the positive lens can be made large, generation of an aberration can be suppressed, and correction of the aberration can also be well carried out.

The following condition (1) specifies the form of the negative lens.

$$0 < S < 0.3 \tag{1}$$

where $S=(r1-r2)/(r1+r2)$, r1 is a curvature radius of the object image side surface of the negative lens, r2 is a curvature radius of the eye point side surface of the negative lens.

If S is less than the minimum of condition (1), it will no longer constitute a negative lens having a concave surface directed toward the eye point side.

On the other hand, if it exceeds the maximum of condition (1), the negative power will become too strong, the power in whole eyepiece optical system will become weak, and a finder magnification will become small.

If the power of positive lens is strengthened in order to keep the power of eyepiece optical system strong, it is not desirable since a fluctuation of the aberration will become large when the positive lens is moved in diopter adjustment.

It is more desirable to satisfy the following condition (1') for correction of aberration.

$$0.1 < S < 0.2 \tag{1'}$$

Moreover, to the condition (1) it is possible to limit only either of the minimum value or the maximum value of condition (1').

The following condition (2) specifies the distance between the positive lens and the negative lens, and is the condition for keeping the power of whole eyepiece optical system strong and for carrying out correction of aberration well.

$$0.05 < d1/f < 0.15 \tag{2}$$

Where d1 is a distance of air space between the positive lens and the negative lens where diopter has been adjusted at −0.8 in case that d1 can be changed in the observation optical system, and f is a focal length of the eyepiece optical system.

If d1/f is less than the minimum of condition (2), the distance between the positive lens and the negative lens becomes small. In order to strengthen power of whole eyepiece optical system, power of the positive lens must be strengthened, and consequently spherical aberration cannot be sufficiently corrected.

On the other hand, when it exceeds the maximum of condition (2) the distance between the positive lens and the negative lens becomes large superfluously, and it is impossible to miniaturize an eyepiece optical system.

It is more desirable to satisfy the following condition (2').

$$0.08 < d1/f < 0.14 \tag{2'}$$

If condition (2') is satisfied, it will become easy to balance miniaturization of eyepiece optical system with correction of aberration.

The following condition (3) specifies the surface at the eye point side of the negative lens, and is condition for protecting the ghost light generated by the luminous flux which enters from the eye point side of negative lens.

$$0.86 < r2/IP < 1.72 \tag{3}$$

where r2 is a curvature radius of the eye point side surface of the negative lens, IP is defined as IP=17.4mm when IP is the distance from the surface at the utmost eye point side of the eyepiece optical system to virtual eye point.

That is to say, concretely and approximately, it is desirable to satisfy the following condition with respect to the curvature radius r2 of the eye point side surface of the negative lens:

$$15 \text{ mm} < r2 < 30 \text{ mm}$$

When r2/IP is less than the minimum of condition (3), good observation image cannot be obtained since the curvature radius of the eye point side surface of the negative lens becomes too small, and thus, an incident light flux from the eye point side is reflected on the surface at the eye point side of the negative lens and enters into pupil as a ghost light when observation is carried out in case that a strong light sources such as the sun is behind.

It is not desirable that the curvature radius of the eye point side surface of the negative lens becomes small, because eye relief becomes short substantially.

On the other hand, if it exceeds the maximum of condition (3) the incident light coming from an upper part of camera is reflected by the pupil, and furthermore its luminous flux is reflected at the eye point side surface of negative lens, and generates a ghost light which enters into the pupil again. Accordingly, good image cannot be obtained.

In an observation optical system according to the present invention, it is desirable that the half of exit angle ω (degrees) of the object image at the position 17.4 mm apart from the utmost eye-point-side surface in the eyepiece optical system is in the range from 9.1 to 15 degrees.

If the half of the exit angle ω (degree) of the object image is less than the minimum of the range mentioned above, an observation view field will become small.

On the other hand, if the half of exit angle ω (degree) of the object image exceeds the maximum of the range, an optical system will be large in size.

Furthermore, in the observation optical system according to the present invention, it is much better to satisfy the following condition (3').

$$1.0 < r2/IP < 1.6 \quad (3')$$

where r2 is a curvature radius of the eye point side surface of the negative lens, IP is defined as IP=17.4 mm when IP is the distance from the surface at the utmost eye point side of the eyepiece optical system to virtual eye point.

If condition (3') is satisfied, it is desirable for securing eye relief and reduction of a ghost.

Aberration can be well corrected if aspherical surface is used for the surface at the object image side of the positive lens as seen in the present invention.

If the power of the positive lens is strengthened, the amount of generating of spherical aberration becomes large and it causes insufficient correction of aberration. Consequently, it leads to degradation of observation image.

So, in the present invention, generation of spherical aberration is suppressed by using an aspherical surface at the surface of the object image side of the positive lens, the power of which becomes weak as it is apart from the optical axis.

Furthermore, in the observation optical system of the present invention, the negative lens is fixed and diopter adjustment is carried out by moving the positive lens.

If both of the positive lens and the negative lens are moved along the optical axis for diopter adjustment, more space between the negative lens and the eyepoint is needed, and at the same time, the amount of movement will become large, because the power for diopter adjustment becomes smaller, comparing with a case where only the positive lens is moved.

Furthermore, in the observation optical system according to the present invention, it is good to arrange an object optical system for forming the object image at the object image side of the prism.

Moreover, in the observation optical system according to the present invention, it is possible to arrange a liquid crystal display element for forming the object image at the object image side of the said prism.

In the observation optical system according to the present invention, it is possible to arrange a screen mat for forming the object image at the object image side of the said prism.

In the observation optical system of the present invention, miniaturization can be achieved by satisfying the following condition (4).

$$1.0 < Y/Yp < 3.0 \quad (4)$$

where Y is the diagonal length of an observable picture area on an image plane of the object image and Yp is a supposed diameter of the entrance pupil and defined as Yp=4.0 mm.

The condition (4) specifies the ratio of the diagonal length of the observable picture area on the image plane of the object image to the diameter of the entrance pupil.

If Y/Yp is less than the minimum of condition (4), the range which can be viewed as a view system becomes small, and it will be hard to be observed.

If magnification ratio is enlarged, the power of eyepiece optical system will become strong and it will become easy to generate an aberration.

On the other hand, if it exceeds the maximum of condition (4) the whole diameter will become large and miniaturization will become difficult.

If the condition in which the maximum value of the condition (4) is set as 2.3 is satisfied, it will become more advantageous for miniaturizing.

If the condition in which the minimum limit of the condition (4) is set as 1.3 is satisfied, it will become easy to acquire a visual field which is easier to observe.

Furthermore, it is desirable that the observation optical system of the present invention is used for the camera equipped with a photographing optical system.

Hereafter, embodiments of the present invention will be explained using drawings.

The First to the Third Embodiment

FIG. 1 is a sectional view in a diagonal direction, developed along the optical axis of the first embodiment of an observation optical arrangement according to the present invention, wherein a reflecting surface is omitted.

Figure 2:
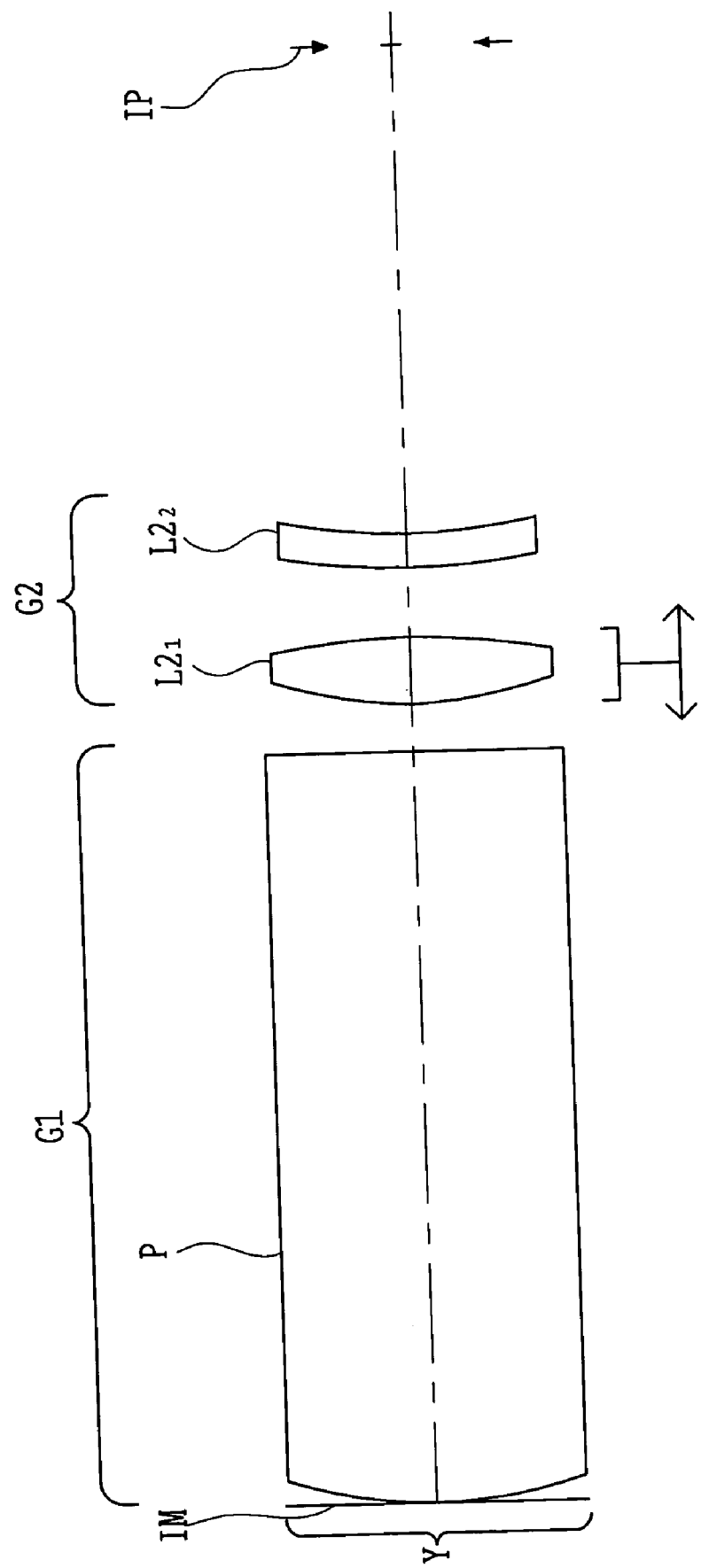
FIG. 2 is a sectional view, in a diagonal direction developed along the optical axis, of the second embodiment of an observation optical arrangement according to the present invention, wherein a reflecting surface is omitted.

FIG. 2 is a sectional view in a diagonal direction, developed along the optical axis, of the second embodiment of an observation optical arrangement according to the present invention, wherein a reflecting surface is omitted.

Figure 3:
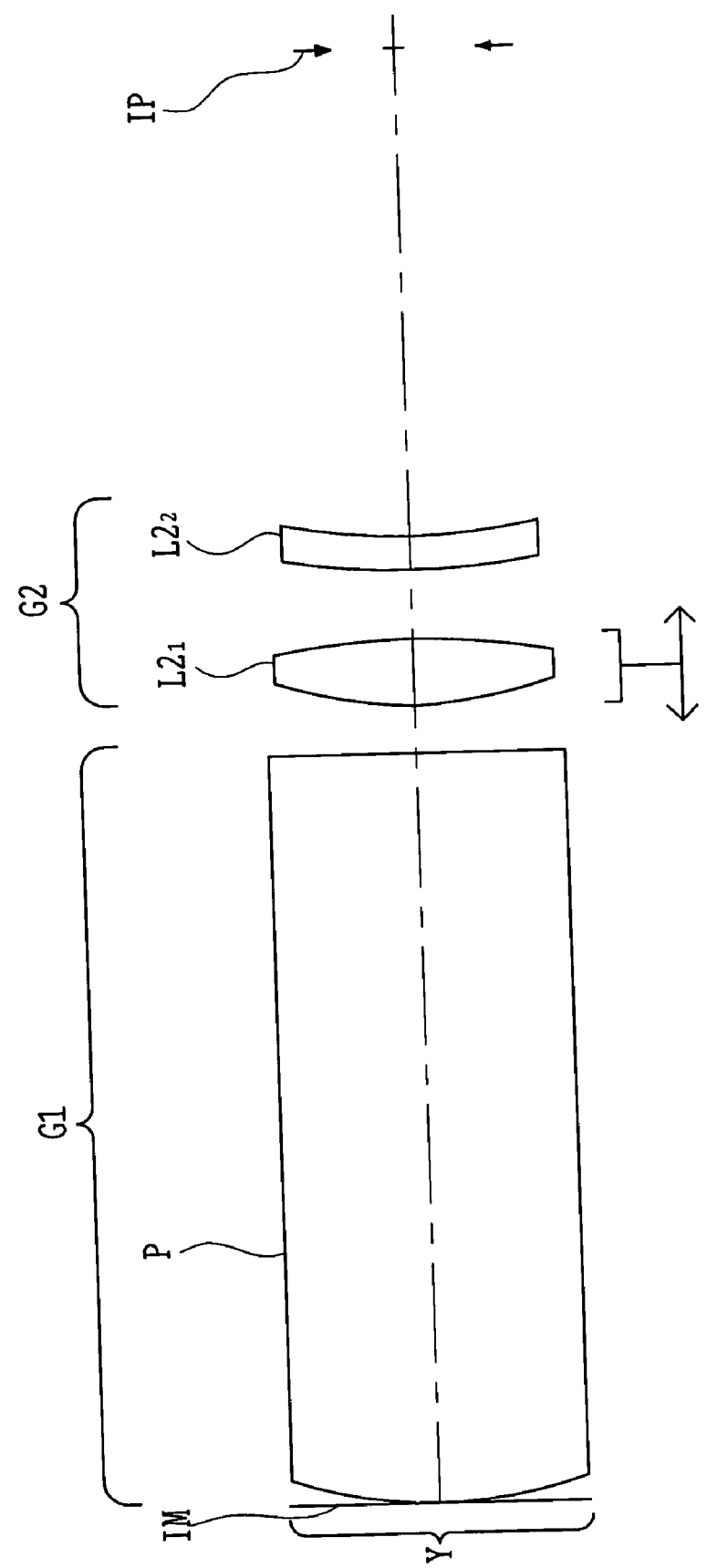
FIG. 3 is a sectional view, in a diagonal direction developed along the optical axis of the third embodiment of an observation optical arrangement according to the present invention, wherein a reflecting surface is omitted.

FIG. 3 is a sectional view in a diagonal direction, developed along the optical axis of the third embodiment of an observation optical arrangement according to the present invention, wherein a reflecting surface is omitted.

In these Figures, IM is an image plane of an object image, IP is an eye point and Y is diagonal length of an observable picture area on the image plane IM.

Each observation optical system of the first to the third embodiment comprises in order from an object image side, an erect image optical system G1 which forms an erecting image of an object image, and an eyepiece optical system G2 for observing the erecting image of the object image.

The erect image optical system G1 comprises prism P. The surface of the object image side of prism P is convex. The eyepiece optical system G2 comprises in order from the object image side, a positive single lens L21 having double convex surfaces and a negative meniscus lens L22 having concave surface directed toward the eye point side.

The positive single lens L21 is formed so as to have an aspherical surface, the power of which becomes weak as the object image side surface departs from the optical axis.

In the observation optical system of each embodiment mentioned above, a diopter adjustment is performed by fixing the negative lens L22 and moving the positive single lens L21.

Lens data of optical members constituting the observation optical systems of the first to the third embodiment are listed below.

In the numerical data, $r_1$, $r_2$, - - - denote, in order from an object image side, radii of curvature of individual lens surfaces; $d_1$, $d_2$, - - - denote, in order from an object image side, thickness of individual lenses or air space between them (unit mm); $n_{d1}$, $n_{d2}$, - - - denote, in order from an object image side, refractive indices of individual lenses at the d line; and $v_{d1}$, $v_{d2}$, - - - denotes, in order from an object image side, Abbe's numbers of individual lenses.

Also, when z is taken as the coordinate in the direction of the optical axis, y is taken as the coordinate normal to the optical axis, K represents a conic coefficient, and $A_4$, $A_6$, $A_8$, and $A_{10}$ represent aspherical coefficients, the configuration of each of the aspherical surface is expressed by the following equation:

$$z=(y^2/r)/[1+\{1-(1+K)(y/r)^2\}^{1/2}]+A_4y^4+A_6y^6+A_8y^8+A_{10}y^{10}$$

These symbols hold for the numerical data of embodiments to be described later.

It is common in each embodiment that the object image surface is in contact with top of the object image side surface of prism P, and diagonal length Y of an observable area on the image plane of an object image is set at 6.72 mm.

--- numerical data 1 (the first embodiment)
focal length of eyepiece f = 19.6
diopter D = −0.8
half of exit field angle (degree) ω = 9.96
eye relief: distance from an exit surface of eyepiece
to eye point (mm): 17.4

---

$r_1 = 14.1062$    $d_1 = 26.90$    $n_1 = 1.52542$    $v_1 = 55.78$
$r_2 = \infty$    $d_2 = 1.72$
$r_3 = 14.1158$    $d_3 = 2.44$    $n_3 = 1.49236$    $v_3 = 57.86$
(aspherical surface)
$r_4 = -24.1045$    $d_4 = 2.38$
$r_5 = 25.4875$    $d_5 = 1.20$    $n_5 = 1.49236$    $v_5 = 57.86$
$r_6 = 19.8000$ aspherical surface coefficient
the third surface $k = 0.3151$
$A_4 = -1.3040 \times 10^{-4}$    $A_6 = -7.9908 \times 10^{-7}$    $A_8 = 4.0073 \times 10^{-8}$
$A_{10} = 5.0867 \times 10^{-10}$ numerical data 2 (the second embodiment)
focal length of eyepiece f = 19.6
diopter D = −0.8
half of exit field angle (degree) ω = 9.96
eye relief: distance from an exit surface of eyepiece
to eye point (mm): 17.4

---

$r_1 = 14.2041$    $d_1 = 26.90$    $n_1 = 1.52542$    $v_1 = 55.78$
$r_2 = \infty$    $d_2 = 1.72$
$r_3 = 14.1424$    $d_3 = 2.4$    $n_3 = 1.49236$    $v_3 = 57.86$
(aspherical surface)
$r_4 = -23.5036$    $d_4 = 2.5$
$r_5 = 30.19$    $d_5 = 1.20$    $n_5 = 1.49236$    $v_5 = 57.86$
$r_6 = 22.15000$ aspherical surface coefficient
the third surface $k = 0.4048$
$A_4 = -1.3444 \times 10^{-4}$    $A_6 = -9.8314 \times 10^{-7}$    $A_8 = 4.6845 \times 10^{-8}$
$A_{10} = -6.2240 \times 10^{-10}$ numerical data 3 (the third embodiment)
focal length of eyepiece f = 19.53
diopter D = −0.8
half of exit field angle (degree) ω = 9.69
eye relief: distance from an exit surface of eyepiece
to eye point (mm): 17.4

---

$r_1 = 14.1884$    $d_1 = 26.90$    $n_1 = 1.52542$    $v_1 = 55.78$
$r_2 = \infty$    $d_2 = 1.72$
$r_3 = 13.6618$    $d_3 = 2.44$    $n_3 = 1.49236$    $v_3 = 57.86$
(aspherical surface)
$r_4 = -22.0085$    $d_4 = 2.25$
$r_5 = 46.4788$    $d_5 = 1.20$    $n_5 = 1.49236$    $v_5 = 57.86$
$r_6 = 25.7993$ aspherical surface coefficient
the third surface $k = 0.3153$
$A_4 = -1.4567 \times 10^{-4}$    $A_6 = -9.4906 \times 10^{-7}$    $A_8 = 4.5239 \times 10^{-8}$
$A_{10} = -5.9779 \times 10^{-10}$ Corresponding values to conditions mentioned above in each embodiment are shown in the following table 1, wherein values corresponding to the condition (4) has been calculated as Yp=4.0 mm.

TABLE 1

|  | condition (1) | condition (2) | condition (3) | condition (4) |
|---|---|---|---|---|
| the first embodiment | 0.126 | 0.121 | 1.14 | 1.68 |
| the second embodiment | 0.154 | 0.128 | 1.27 | 1.68 |
| the third embodiment | 0.286 | 0.115 | 1.48 | 1.68 |

In addition, in the observation optical system of each embodiment mentioned above, the number of reflective surfaces in prism P can be one, two or three.

It is desirable to arrange in order of a screen mat, a penta roof prism and an eyepiece optical system, for example when the observation optical system of each embodiment mentioned above is used as a finder of a single-lens reflex camera using film or for electronic image photographing.

And it is good to arrange, at the object image side of the screen mat, a photographing lens system and optical path dividing optical elements, such as a quick return mirror, a half prism or the like which reflects an image to the screen mat side.

Moreover, in the constitution mentioned above, a liquid crystal display element can be used in place of a screen mat as an electronic view finder.

The object image displayed on the liquid crystal display element can be displayed by arranging a photographing optical system prepared separately from an observation optical system and an imaging element (for example, CCD, C-MOSS sensor)disposed on the photographing optical system and by transmitting an electric signal of the photographing object image from an image sensor to the liquid crystal display element through a controller.

Thus, by such constitution an electronic finder for a video camera or digital still cameras can be achieved.

When the observation optical system of the present invention is used in a compact camera for films or a compact digital camera for electronic image photography, it is desirable to constitute the observation optical system as a real image type finder wherein an object image is formed by an object lens.

In this case, a photographing lens system and an observation optical system are constituted separately.

An erecting prism used for the present invention can be constituted by a Porro prism or a plurality of prisms made from a Porro prism divided into two or more.

Also, it can be constituted by combination of two prisms, a roof prism and a penta prism.

In other cases, as long as the reflective constitution can be used in order to form an erect image, it can be constituted with any change within limits complying with other constituent requirements of the present invention.

Next, embodiments of the apparatus using an observation optical system according to of the present invention will be explained.

Figure 4:
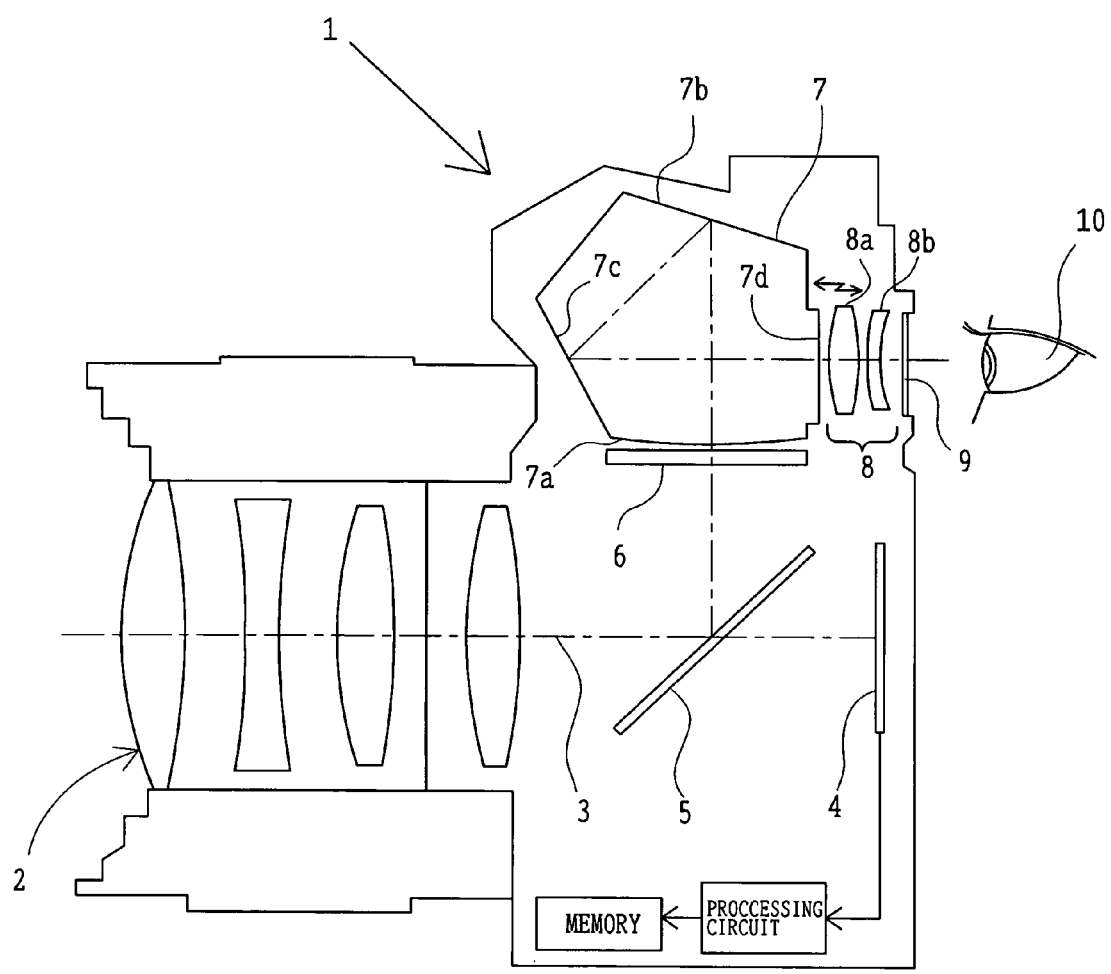
FIG. 4 is an outlined constitutional view showing an embodiment of a single-lens reflex camera having an observation optical arrangement according to the present invention.

FIG. 4 is an outline constitution diagram showing an embodiment of a single lens reflex camera equipped with the observation optical system of the present invention.

The single-lens reflex camera 1 of the embodiment shown in FIG. 4 is constituted so as to be able to exchange a taking lens 2 to the camera by a mounting part which is not illustrated.

In the present invention, as long as a taking lens can be mounted in a constitution, it is defined as what is a single lens reflex camera, even if the constitution does not comprise a taking lens.

In FIG. 4. reference numeral 4 is CCD as an electronic image element. By image processing based on the signal from this CCD 4 in a processing circuit, picture information is recorded in a memory.

The recorded picture information can be used for displaying image with a personal computer and the like which are not illustrated, or can be recorded and stored in various information storage media.

Reference numeral 5 represents a quick return mirror arranged between a taking lens 2 and CCD 4 on the optical axis 3 of the taking lens 2. Reference numeral 6 is a finder screen arranged at the optical path of the light reflected from the quick return mirror 5, and the incident surface or the exit side surface comprises a sand polished surface and the like. Reference numeral 7 is a penta roof prism as an erect image optical system of the present invention, and the penta roof prism 7 is provided with, in order along the optical path, a convex incident surface 7a, a roof reflective surface 7b, a plane reflective surface 7c and a plane exit surface 7d. Reference numeral 8 is an eyepiece. The penta roof prism 7 and the eyepiece 8 as an observation optical system of the present invention are constituted with either one of the modes shown in the first to the third embodiment.

The parallel plane plate 9 as a cover glass is formed in the exit side of the eyepiece 8.

Then, exit luminous flux is led to an observer's pupil 10, and the picture to be photographed can be observed.

The single lens reflex camera of the present invention may have constitution in which the taking lens 2 cannot be exchanged because it is united with the main body of the single lens reflex camera.

Figure 5:
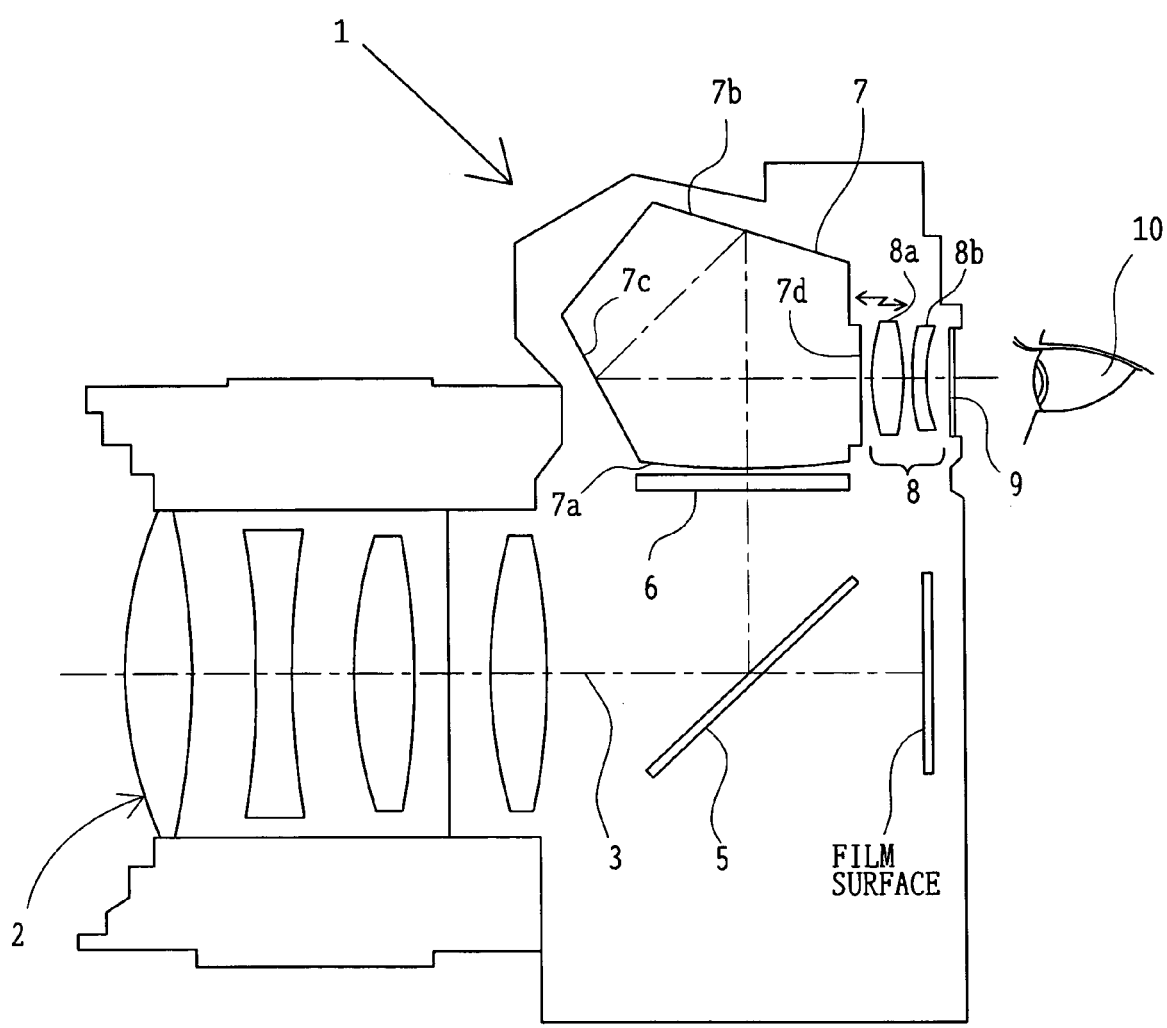
FIG. 5 is an outlined constitutional view showing another embodiment of a single-lens reflex camera having an observation optical arrangement according to the present invention.

As shown in FIG. 5, the photographic film may be arranged instead of CCD 4. FIG. 5 is an outlined constitution diagram showing another embodiment of the single lens reflex camera using film, which is equipped with an observation optical system of the present invention. It is possible to use constitution having a half mirror and an optical path division prism instead of the quick return mirror 5.

Screen surface 6 can be constituted with a surface where minute prisms are gathered, a hologram surface, etc instead of the sand polished surface.

A surface facing the screen surface 6 can be constituted with an optical surface such as a Fresnel lens surface, a convex lens surface and the like having convergence function in order to raise a condensing action of the light at peripheral portion of picture plane.

There is no problem whichever cover glass 9 is arranged or not. However, in the constitution wherein cover glass 9 is arranged, a half of exit field angle is defined as the angle which is made between the optical axis and the chief ray of the most off axis at the point on the optical axis which is apart 17.4 mm in the term of the air conversion length to the direction of an optical axis from the exit surface of the second lens element 8b of the eyepiece 8.

In case of the constitution where diopter adjustment is carried out, the first lens element 8a of eyepiece 8 is moved on an optical axis, and the second lens element 8b is fixed.

It is also possible to adopt constitution in which the diopter adjustment is not carried out by moving lens. For example, it is possible to adopt such constitution that an eyepiece is fixed, and in carrying out diopter adjustment the cover glass is exchanged by a diopter compensation lens which is not illustrated.

Figure 6:
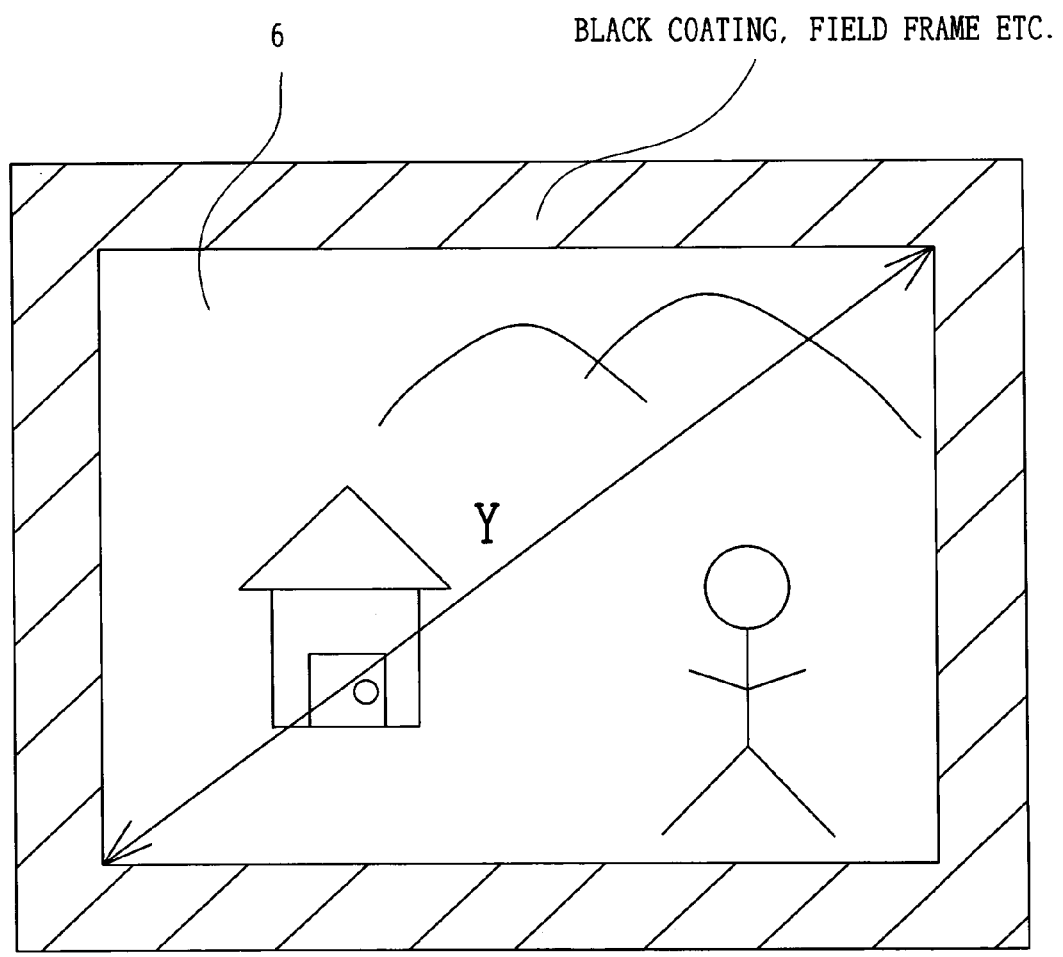
FIG. 6 is an explanatory diagram showing a screen plane constituted with sand brushed plane and the like in a camera of the embodiments shown FIGS. 4 and 5.

FIG. 6 shows a screen surface 6 which comprises the sand polished surface and the like in the camera of the embodiments shown in FIG. 4 and FIG. 5. Constitution for limiting view field (for example, black painting, a view frame, etc.) is adopted on the screen surface 6 or its neighborhood. Here, Y is diagonal length of observable picture area on the screen surface 6.

Figure 7:
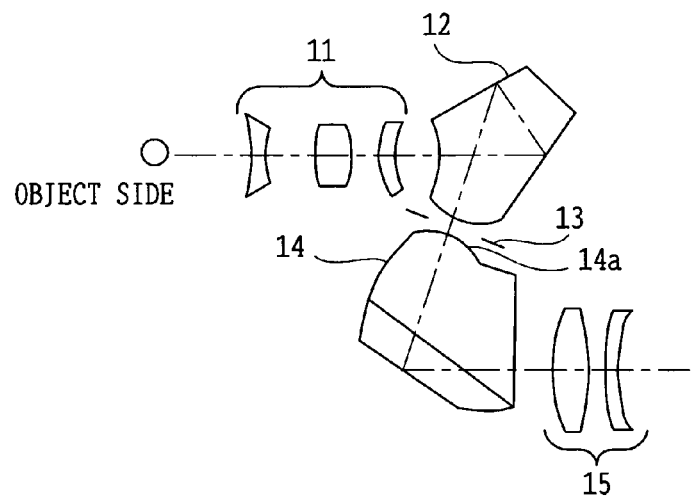
FIG. 7 is an outlined constitutional view of a finder optical system showing a modified example of an erect image optical system applicable to an observation optical system according to the present invention.
Figure 8:
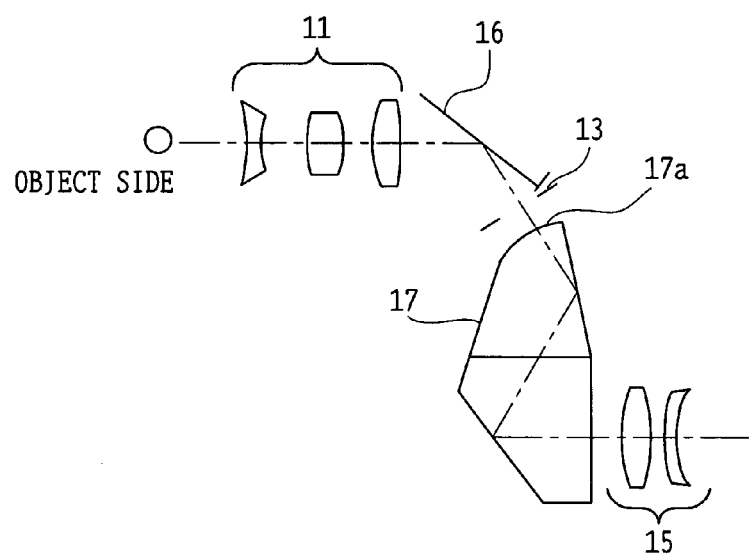
FIG. 8 is an outlined constitutional view of a finder optical system showing another modified example of an erect image optical system applicable to an observation optical system according to the present invention.
Figure 9:
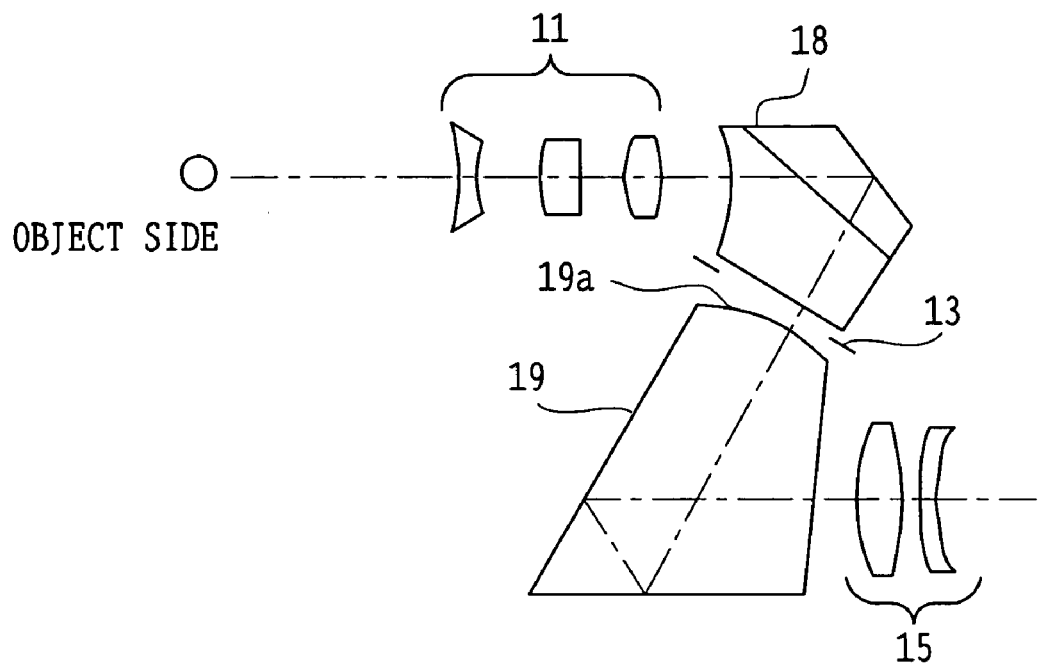
FIG. 9 is an outlined constitutional view of a finder optical system showing further other modified example of an erect image optical system applicable to an observation optical system according to the present invention.

FIGS. 7 to 9 are outlined constitutional views showing embodiments of a real image type finder optical system using an observation optical system according to the present invention.

In these FIGS. 7 to 9, reference numeral 11 represents an object optical system, 13 is a view frame and 15 is an eyepiece in the observation optical system of the present invention.

Figure 10:
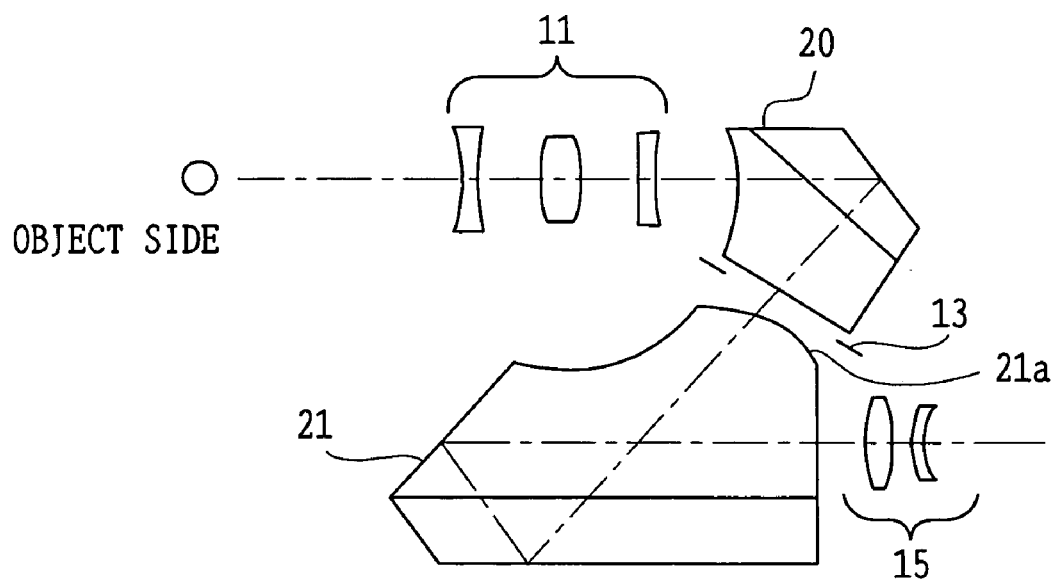
FIG. 10 is an outlined constitutional view of a finder optical system showing furthermore other modified example of an erect image optical system applicable to an observation optical system according to the present invention.

The constitution of an erect image optical system applicable to the observation optical system of the present invention is not limited to the constitutions in each embodiment mentioned above. For example, there are various constitutions including constitution in which a penta prism 12 and a roof prism 14 having a convex surface on the incident surface 14a at the object image side are combined as shown in FIG. 7, and the constitution in which an obtuse angle reflective surface 16 and an incident surface 17a at the object image side are convex forms, and prism 17 having a roof reflective surface with z like shape optical path is combined as shown in FIG. 8. Furthermore, it is also possible to adopt other various constitution such as constitution combining the roof prism 18 and the penta prism 19 having a convex surface of an incident surface 19a at an object image side as shown in FIG. 9, and constitution combining triangular prism 20 having a convex incident surface and penta roof prism 21 having a convex incident surface 21a an object image side as shown in FIG. 10.

Figure 11:
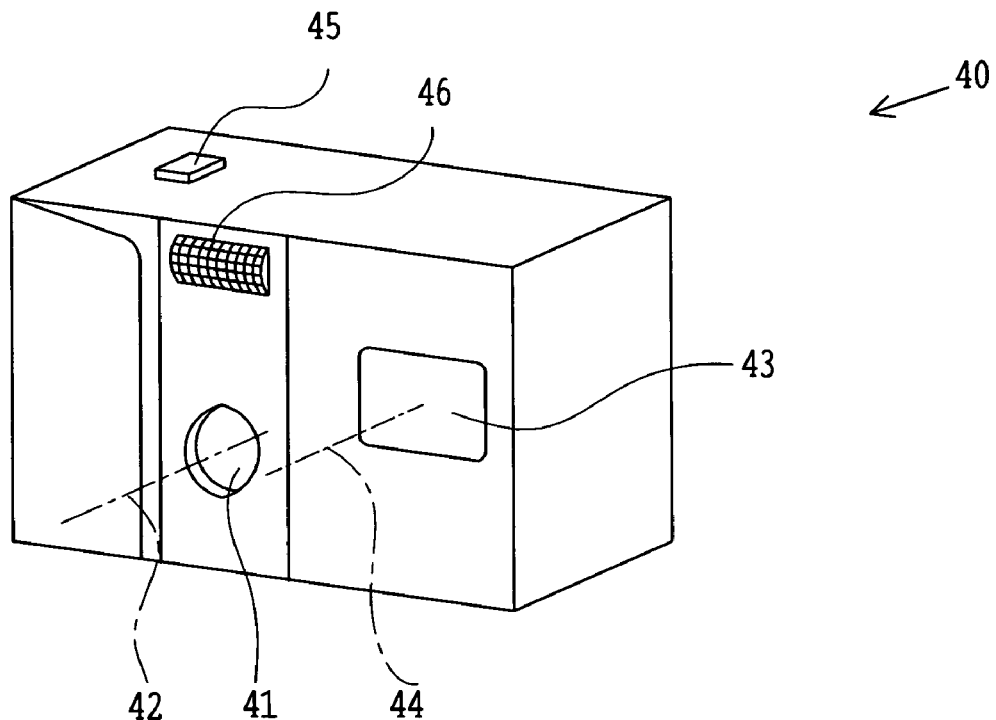
Figure 12:
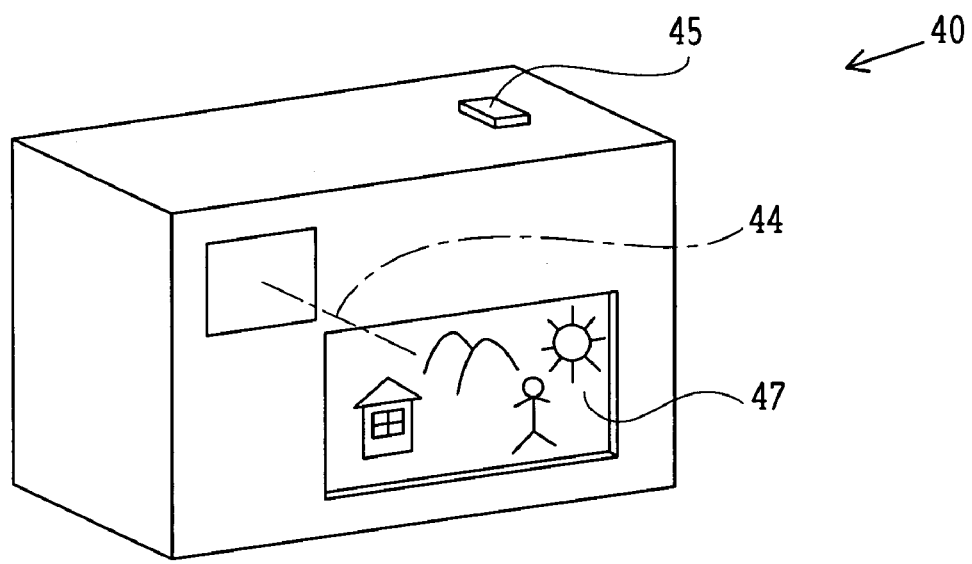
FIG. 12 is an outlined perspective rear view showing the digital camera shown in FIG. 11.
Figure 13:
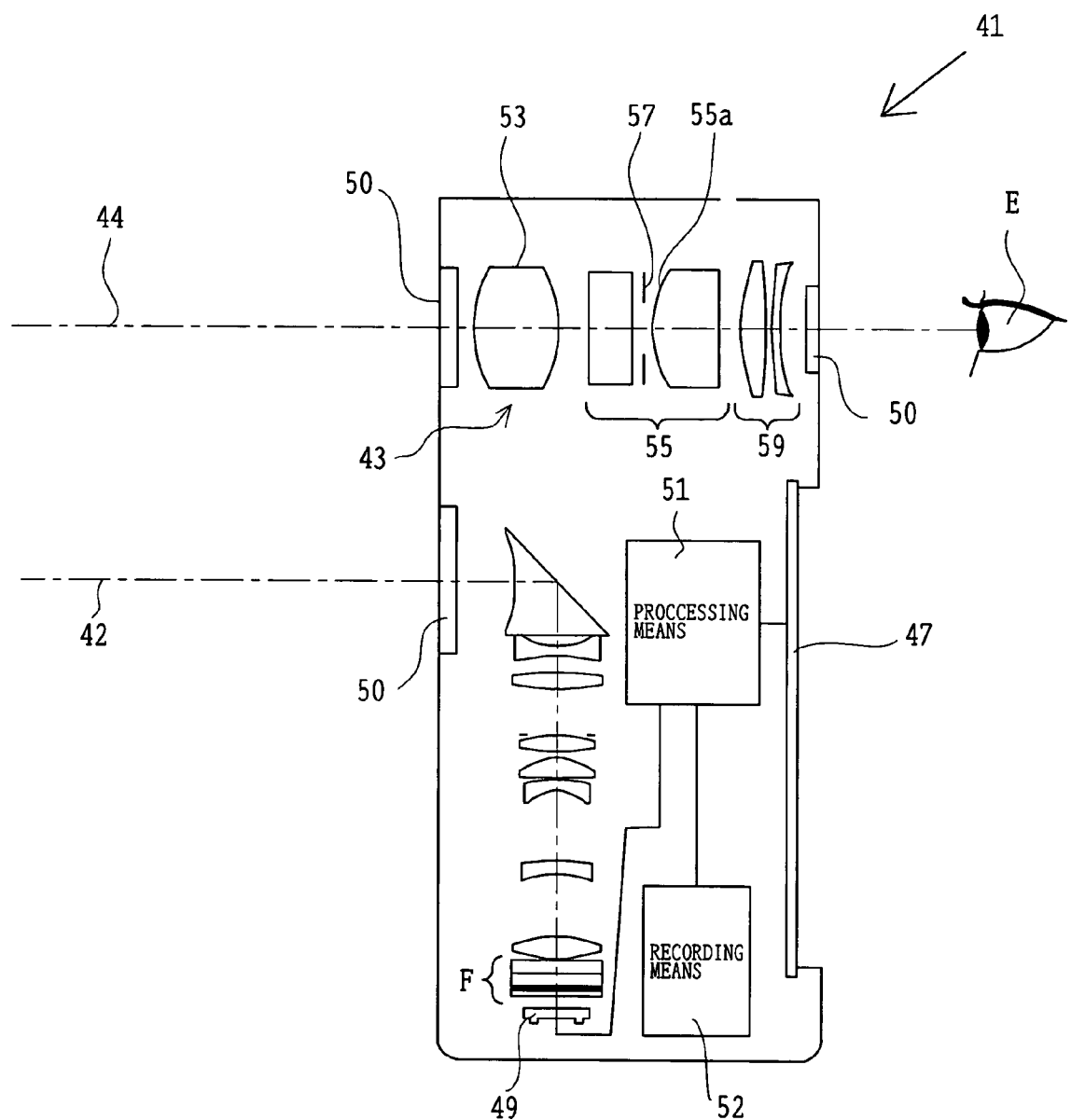
FIG. 13 is a sectional view showing internal structure of the digital camera shown in FIG. 11.

FIGS. 11 to 13 are conceptual diagrams of the embodiments which incorporate an observation optical system according to the present invention in a compact type digital camera. FIG. 11 is a perspective front view showing an outward appearance of digital camera 40, FIG. 12 is a perspective rear view showing digital camera 40 and FIG. 13 is a sectional view showing an internal constitution of digital camera 40.

In the case of this embodiment, digital camera 40 comprises photographing optical system 41 having optical path 42 for photographing, finder optical system 43 having optical path 44 for finder, a shutter button 45, a flash unit 46 and liquid crystal display monitor 47 and so on.

When shutter button 45 arranged at the upper part of a camera 40 is pressed, by responding it photographing will be carried out through photographing optical system 41.

An object image formed by the photographing optical system 41 is formed on an imaging plane of CCD 49 through near-infrared cut filter and optical low pass filter in a group of parallel plane plates F.

The object image received by this CCD 49 is displayed on the liquid crystal display monitor 47 arranged at the backside of the camera as an electronic picture through a processing means 51.

This processing means 51 is connected to record means 52 and the photographed electronic picture can also be recorded. This record means 52 may be arranged separately from processing means 51 and it is also possible to constitute so as to write a record electronically by using a flexible disk, memory card, MO, etc. It is also possible to constitute it as a film based camera using silver halide film instead of CCD 49.

Furthermore, on optical path 44 for finder, the object optical system 53 for finder is arranged. The object image formed of this object optical system 53 for finder is formed on the view frame 57 of the prism group 55 having a convex incident surface 55*a* at the object image side which is constituted as an erect image optical system in the observation optical system of the present invention. Behind this prism group 55, an eyepiece optical system 59 in the observation optical system of the present invention which leads an erecting image to an observer eyeball E is arranged.

Cover members 50 are arranged at the incident side of a photographing optical system 41 and the object optical system 53 for finder as well as the exit side of an eyepiece optical system 59, respectively.

In the example in FIG. 13, parallel plane plates are arranged as cover members 50. Instead of these, lenses with power can be used.

What is claimed is:

1. An observation optical system comprising:
   an image erecting optical system for forming an erect image of an object image; and
   an eyepiece optical system for observing the object image which has been formed into the erect image,
   wherein the image erecting optical system comprises at least one prism, an object-image-side, entrance surface of which comprises a convex surface,
   wherein the eyepiece optical system comprises, in order from an object-image side, a positive single lens having double convex surfaces and a negative meniscus lens having a concave surface directed toward an eye-point side, making it possible to observe the object image at a position, as an eye point, separated from an utmost eye-point-side surface of the eyepiece optical system by a distance of 17.4 mm, and satisfying the following conditions:

$0 < S < 0.3$ $0.05 < d1/f < 0.15$ $0.86 < r2/IP < 1.72$ where $S=(r1-r2)/(r1+r2)$, r1 is a curvature radius of an object-image-side surface of the negative meniscus lens, r2 is a curvature radius of an eye-point-side surface of the negative meniscus lens, d1 is an air space between the positive single lens and the negative meniscus lens where a value of the air space, if variable, is taken as d1 when a diopter of the observation optical system is adjusted to be −0.8 (m$^{-1}$), f is a focal length of the eyepiece optical system, and IP is the distance from the utmost eye-point-side surface of the eyepiece optical system to the eye point, a value of which is 17.4 mm.

2. An observation optical system according to claim 1, wherein the negative meniscus lens is fixed and adjustment of the diopter is carried out by moving the positive single lens.

3. An observation optical system according to claim 1, further comprising an object optical system for forming the object image on the object-image side of the prism.

4. An observation optical system according to claim 1, further comprising a liquid crystal display element for forming the object image on the object-image side of the prism.

5. An observation optical system according to claim 1, further comprising a screen mat for forming the object image on the object-image side of the prism.

6. An observation optical system according to claim 1, wherein the following condition is satisfied:

$0.1 < S < 0.2$.

7. An observation optical system according to claim 6, further comprising an object optical system for forming the object image on the object-image side of the prism.

8. An observation optical system according to claim 6, further comprising a liquid crystal display element for forming the object image on the object-image side of the prism.

9. An observation optical system according to claim 6, further comprising a screen mat for forming the object image on the object-image side of the prism.

10. An observation optical system according to claim 1, wherein the following condition is satisfied:

$0.08 < d1/f < 0.14$.

11. An observation optical system according to claim 10, wherein an object-image-side surface of the positive single lens is constructed as an aspherical surface.

12. An observation optical system according to claim 1, wherein half of an exit angle ω (degrees) of the object image at the position 17.4 mm apart from the utmost eye-point-side surface of the eyepiece optical system is within a range from 9.1 to 15.0 degrees.

13. An observation optical system according to claim 1, wherein the following condition is satisfied:

$1.0 < r2/IP < 1.6$.

14. An observation optical system according to claim 1, satisfying the following condition:

$1.0 < Y/Yp < 3.0$ where Y is a diagonal length of an observable picture area on an image plane of the object image and Yp is a supposed diameter of an entrance pupil, which is defined to have a value of 4.00 mm.

15. An observation optical system according to claim 1, wherein an object-image-side surface of the positive single lens is constructed as an aspherical surface.

16. An observation optical system according to claim 15, wherein the aspherical surface is shaped to have a weaker power at a point thereon farther from an optical axis.

17. An observation optical system according to claim 16, wherein the negative meniscus lens is fixed and adjustment of the diopter is carried out by moving the positive single lens.

18. A camera comprising:
    an observation optical system according to any one of claims 1, 2, 3–10, 12–14, and 15–17; and
    a photographing optical system.

* * * * *